Nov. 27, 1951     K. A. BLEWETT     2,576,563
SWIVEL JOINT
Filed May 9, 1950
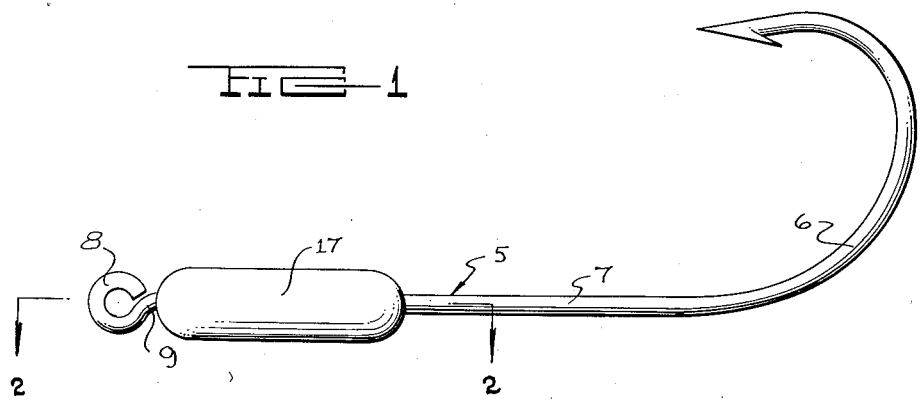
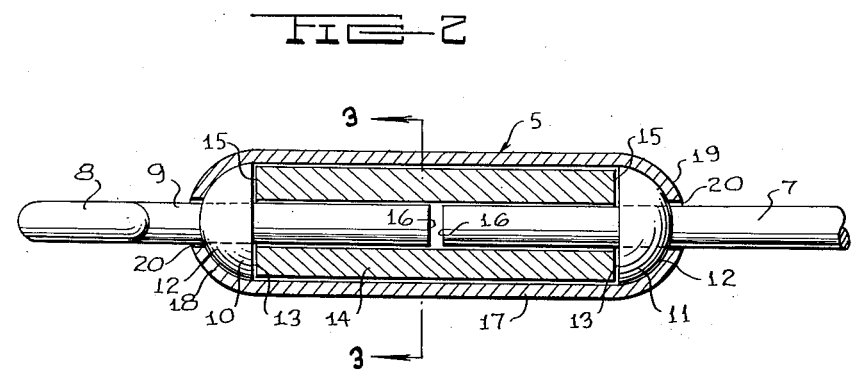
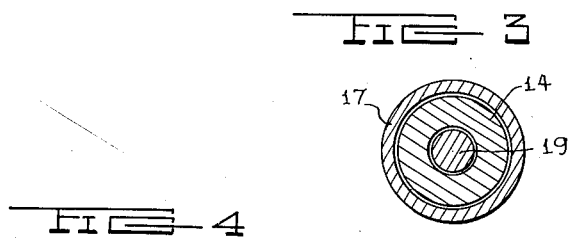
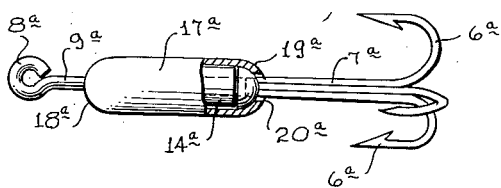
INVENTOR.
KIRBY A. BLEWETT
BY
McMorrow, Berman + Davidson
ATTORNEYS Patented Nov. 27, 1951

2,576,563

UNITED STATES PATENT OFFICE 2,576,563

SWIVEL JOINT

Kirby A. Blewett, Corpus Christi, Tex.

Application May 9, 1950, Serial No. 160,983

2 Claims. (Cl. 287—91)

This invention relates to an improved swivel fishhook, the primary object of the invention being to provide a more practical and efficient device of this kind, wherein the swiveling action is freer, and sidewise play between the rotatable components is substantially eliminated.

Another important object of the invention is to provide a device of the character indicated above having a dual swivel arrangement wherein the eye and shank portions of the hook are independently rotatable relative to each other and to means enclosing and connecting these portions.

Other important objects and advantageous features of the invention will be apparent from the following description and the accompanying drawings, wherein, for purposes of illustration only, specific embodiments of the invention are set forth in detail.

In the drawings, wherein like numerals designate like parts throughout the several views:

Figure 1 is a side elevation;

Figure 2 is an enlarged fragmentary longitudinal section, taken on the line 2—2 of Figure 1;

Figure 3 is a transverse section taken on the line 3—3 of Figure 2;

Figure 4 is a side elevational view, on a reduced scale, of another embodiment, partly broken away.

Referring in detail to the drawings, the numeral 5 generally designates the swivel fishhook of Figures 1 to 3, comprising a hook 6 having a straight, round shank portion 7, an eye 8 having a straight, round shank portion 9, these shank portions having intermediate their ends the axial, hemispherical enlargements 10 and 11, respectively, facing in opposite directions with their round ends 12 directed outwardly and their plane ends 13 directed inwardly. Rotatably circumposed on the shank portions 7 and 9, between the enlargements 10 and 11, is a cylindrical sleeve 14 having plane ends 15 rotatably engaging the plane ends 13 of the enlargements 10 and 11. The sleeve 14 is of such length that the engagement of its ends with the enlargements maintains the inner ends 16 of the shank portions 7 and 9 out of contact with each other for free turning thereof relative to each other, as shown in Figure 2.

Enclosing and assembling the shank portions 7 and 9 and their enlargements 10 and 11, respectively, is the cylindrical, tubular housing 17 having hollow hemispherical ends 18 and 19, conformably engaging the rounded outer ends 12 of the enlargements 10 and 11, respectively, and formed with axial holes 20, whose edges form journal bearings for the shank portions 7 and 9. The proportioning and arrangement of the parts is such that the shank portions turn freely in the holes 20, the enlargements turn freely in the hemispherical housing ends 18 and 19, and the shank portions 7 and 9 turn freely in the bore of the sleeve 14, all without substantial endwise or sidewise movement relative to each other, and the sleeve 14 is also freely rotatable in the housing 17 without undue looseness.

It will be obvious that with a fishing line (not shown) secured to the eye 8, the hook 6 can swivel freely relative to the eye 8 in either direction, and that the freedom of both the eye and the hook to rotate independently of each other precludes binding which is characteristic of other devices of this character.

In Figure 4 is shown an embodiment involving, instead of the single hook 6, a plurality of hooks 6a whose common shank portion 7a is journaled in the hole 20a of the adjacent hemispherical end 18a of the housing 17a and has a hemispherical enlargement engaged with the housing end 19a, the device being otherwise similar to the device 5 of Figures 1 to 3.

I claim:

1. In combination, a tubular cylindrical housing having closed concave ends, shanks journalled axially through said concave ends, convex enlargements on said shanks within said housing and bearing rotatably against the concave closed ends of the housing, the axially inward ends of the shanks being in axially spaced relation, and a sleeve circumposed on said shanks between said enlargements, with said enlargements bearing against the ends of said sleeve.

2. In combination, a tubular cylindrical housing having closed concave ends, shanks journalled axially through said concave ends, convex enlargements on said shanks within said housing and bearing rotatably against the concave closed ends of the housing, the axially inward ends of the shanks being in axially spaced relation, and a sleeve circumposed on said shanks between said enlargements, with said enlargements bearing against the ends of said sleeve, said sleeve being cylindrical and being rotatable in said cylindrical housing, the ends of said sleeve being plane and the axially inward ends of said enlargements being plane.

KIRBY A. BLEWETT.

REFERENCES CITED

The following references are of record in the file of this patent:

UNITED STATES PATENTS

| Number | Name | Date |
| --- | --- | --- |
| 632,200 | Pflueger | Aug. 29, 1899 |
| 1,432,059 | Fullington | Oct. 17, 1922 |
| 2,466,243 | Johnson | Apr. 5, 1949 |

FOREIGN PATENTS

| Number | Country | Date |
| --- | --- | --- |
| 923 | Great Britain | Apr. 3, 1857 |